Jan. 14, 1964   J. V. S. DAHLGREN   3,117,497
EXPANSIBLE POWER ELEMENT
Filed Jan. 22, 1962

INVENTOR
JOHN V. S. DAHLGREN

BY Roy E. Raney
ATTORNEY

United States Patent Office 3,117,497
Patented Jan. 14, 1964

3,117,497
EXPANSIBLE POWER ELEMENT
John V. S. Dahlgren, Fair Haven, N.J., assignor to The Wilcolator Company, Elizabeth, N.J., a corporation of New Jersey
Filed Jan. 22, 1962, Ser. No. 167,811
1 Claim. (Cl. 92—91)

This invention relates to expansible power elements, and more particularly to improvements in pressure responsive expansible elements of the type having a pair of circular, thin walled flexible diaphragm members joined at their peripheries to define a space therebetween, and having inlet means usually located centrally of one of the diaphragm members for passing pressure fluid to and from said space for causing expansion and contraction of the power element, which expansion and contraction is useful in operating switches, valves, and the like.

It is a principal object of this invention to provide an improved expansible power element of the above mentioned character in which the diaphragm members can flex inwardly and outwardly from a neutral or zero pressure position and which comprises a core disposed between the diaphragm members for limiting inward movement thereof and for increasing the sensitivity of the power element to small changes in pressure.

As another object this invention aims to provide an improved flexible diaphragm power element including a rigid core which is relatively thick at the periphery thereof and has sloping surfaces leading to a relatively thin central portion so as to provide a rigid support about the periphery of the diaphragm members and progressive support to increasing areas of the diaphragm members as they are deflected inwardly from a neutral position in which they are in spaced relation to the center portion of the core.

It is another object of this invention to provide an expansible power element construction having a core which is disposed between the flexible diaphragm walls and is provided with stepped annular shoulders around the periphery thereof for receiving axially extending flanges of the diaphragm members in over-lapped relation with one another and having a press fit relation to the core.

The invention further resides in certain constructions and arrangements of parts which provide these and other objects and advantages which will become apparent from the following detailed description of a presently preferred embodiment of the invention read in conjunction with the accompanying sheet of drawings forming a part of this specification, and in which FIG. 1 is a side elevational view of an expansible power element embodying the invention;

Figures 1, 2, 3, 4:
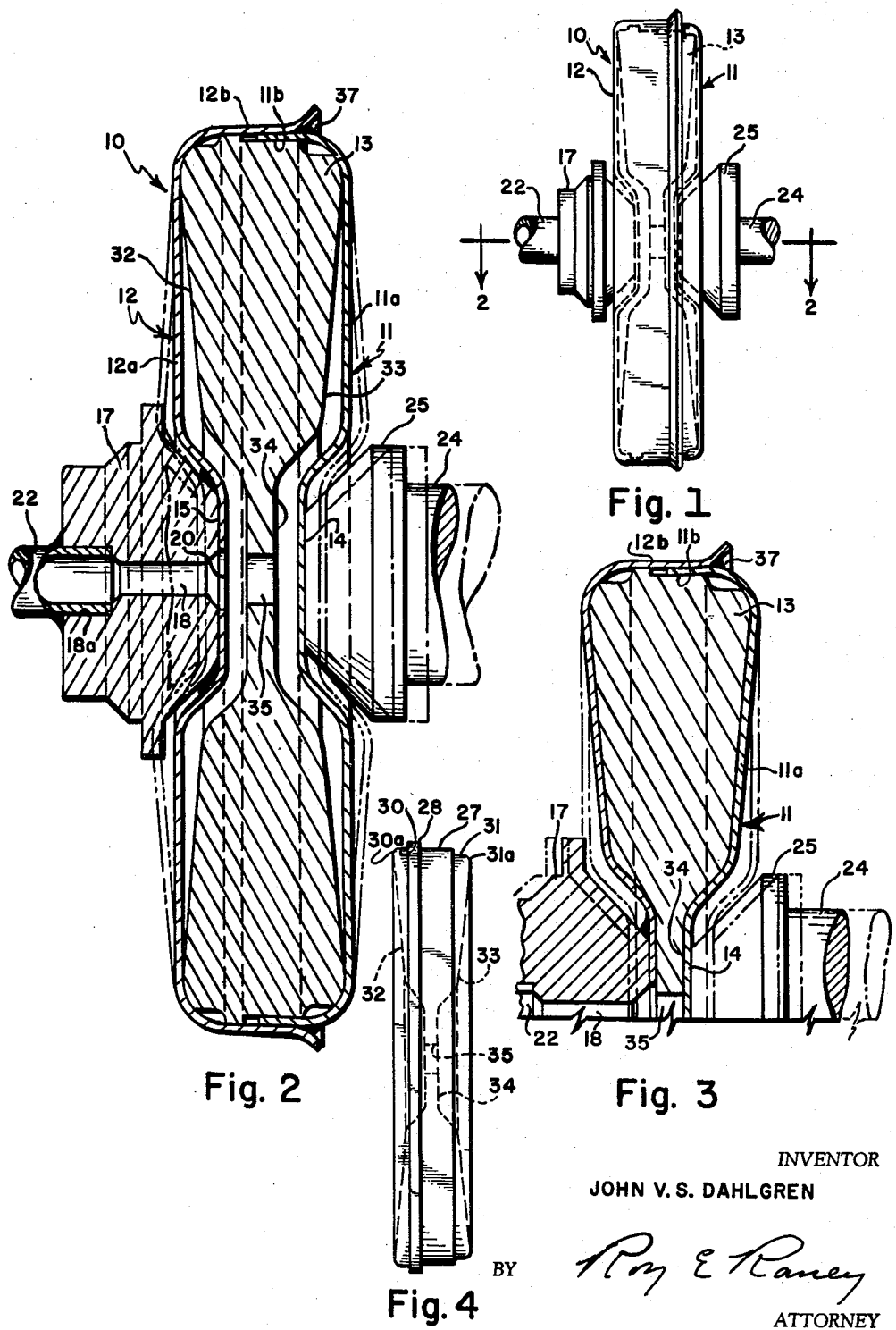
FIG. 2 is an enlarged sectional view of the power element of FIG. 1 taken substantially along line 2—2 thereof.
FIG. 3 is an elevational view of the core of the power element of FIG. 1.
FIG. 4 is a fragmentary sectional view similar to FIG. 2 but showing the parts in different positions.

In the form of the invention shown in the drawings and described hereinafter, there is provided an expansible power element 10 including a first diaphragm member 11, a second diaphragm member 12, and an annular rigid core 13. Diaphragm members 11 and 12 comprise generally circular, resiliently flexible wall portions 11a and 12a, respectively, bounded by axially extending annular flanges 11b and 12b, respectively. The diaphragm members are secured together with the flanges 11a and 11b in overlapping or telescoping relation to form a flexible envelope around core 13, which envelope is caused to expand or contract in accordance with pressure changes therein, and further details of constructions and manner of operation of the power element will become apparent as the description proceeds.

The central portions of flexible walls 11a and 12a are offset inwardly to provide centrally located depressions 14 and 15. A mounting member 17, having a central bore 18, is secured to flexible wall 12a in the depression 15 thereof, with bore 18 in alignment with an opening 20 formed in the center of wall 12a. Mounting member 17 is secured to wall 12a by brazing, as shown, and bore 18 is counter bored as at 18a to receive the end of a pressure fluid transmitting capillary tube 22. Mounting member 17 thereby serves as means defining a passage for pressure fluid to enter and exit the interior of power element 10 to cause expansion or contraction thereof.

A motion transmitting post 24 having a head portion 25 is secured to flexible wall 11a in the depression 14 thereof by brazing or the like, and post 24 is adapted to transmit axial, linear motion from element 10 to a switch, valve, or other device to be actuated thereby.

Core 13, best illustrated in FIGS. 2 and 4, is preferably formed of brass or other metal and has its thickest dimension near the periphery thereof. The rim of core 13 is stepped so as to provide a first cylindrical surface 27 and a second cylindrical surface 28 separated by a shoulder 29. The rim is also undercut outwardly of those cylindrical surfaces as at 30 and 31. The undercut portions 30 and 31 merge at 30a and 31a with generally circular face portions 32 and 33. Face portions 32 and 33 are complimentary to the inner surfaces of flexible walls 11a and 12 when the latter are deflected toward one another from their normal or neutral pressure condition shown in full lines in FIG. 1 to the full line condition shown in FIG. 3. Thus, the faces 32, 33 present sloping surfaces leading from the relatively thick peripheral portion of the core to a relatively thin central portion 34. The central portion 34 of the core, which lies between depressions 14 and 15, is provided with a central opening 35 for allowing the passage of pressure fluid into and out of the space between flexible wall 11a and core surface 32.

The diaphragm members 11 and 12, and the core 13 are assembled by forcing flange 11b over cylindrical surface 29 with a press fit, forcing flange 12b over cylindrical surface 28 and flange 11b with a press fit, and brazing or soldering flanges 11b and 12b together as at 37. The undercut areas 30 and 31 assure uniform engagement between flexible walls 11a and 12a and the peripheral portions 30a and 31a of core faces 32 and 33. This is of particular importance in eliminating concentrations of stress or strain around the outer portions of the diaphragm members. Moreover, the sloping surfaces 32, 33 of the core provide progressive support for the flexible walls as they are deflected inwardly from their neutral FIG. 1 position, the area of contact being continually increased until the depressions 14 and 15 engage the central portion of the core. This progressive support prevents undue strain from occurring in any given area of the diaphragm members and eliminates the danger of crushing the power element under an inordinately large load. Conversely, when the flexible wall portions 11a and 12a are flexed outwardly of their normal positions to the dotted line positions of FIG. 1, the strain is distributed substantially evenly over the entire surface of these flexible wall areas and radially outwardly to the point of tangential contact with the inwardly curved edges 30a and 31a of the core surfaces 32 and 33.

The use of a rigid core 13 in the above described manner permits a greater stroke for a given diameter of power element, whereby power elements embodying this invention demand less space than do more conventional elements, an important consideration in the design of compact appliances and apparatus. Also, because the rigid core 13 reduces the fluid volume, power elements embodying this invention are less sensitive to changes in ambient temperatures and permit the use of smaller temperature sensing bulbs connected thereto, whereby liquid fill problems are significantly reduced.

From the foregoing detailed description of an expansible power element embodying the present invention, it will be recognized that there has been provided thereby a particularly rugged yet sensitive power element which, because of the unique configuration of the core member, the stresses and strains are evenly distributed throughout the flexible portions of the diaphragm members when the power element is expanded, and the flexible portions are progressively supported when deflected inwardly, all so as to minimize concentrations of stress and likelihood of failure. Of course, the diaphragm walls may be provided with annular corrugations in some instances requiring larger excursions of the diaphragm members, in which case the surfaces 32 and 33 of core 13 would have corresponding corrugations.

Although the present invention has been described in considerable detail and with reference to a specific power element embodying the invention, it will be understood that the invention is not limited thereto, but rather the invention includes all those modifications, adaptations, and variations as are reasonably embraced by the scope of the claim hereof.

Having thus described my invention, I claim:

A pressure responsive power element comprising
(a) first and second diaphragm members each having a resiliently flexible wall and an axially extending annular flange,
(b) a rigid annular core having a central portion of reduced thickness with respect to the peripheral portion of said core,
(c) said first diaphragm member having its annular flange secured to the rim of said core,
(d) said second diaphargm member having a portion of its annular flange disposed in overlying relation to the annular flange of said first diaphragm member and a portion engaging the rim of said core,
(e) said core being disposed between said diaphragm members,
(f) means defining a pressure fluid passage leading to the interior of said power element,
(g) said flexible walls having neutral pressure positions in spaced relation to said center portion of said core,
(h) the surfaces of said central portion of the core being complementary to the interior surfaces of said walls whereby progressive inward deflection of said walls results in a continuous progressive increase in area of supporting contact of said walls by said core,
(i) the rim of said core comprising a first cylindrical surface and a second cylindrical surface with a shoulder between said cylindrical surfaces, said annular flange of said first diaphragm member being in a press fit relation to said first cylindrical surface, and said annular flange of said second diaphragm member being in press fit relation to said second cylindrical surface and to the annular flange of said first diaphragm member, and
(j) said core comprising undercut areas between said cylindrical surfaces and said surfaces of the central portion of said core, said undercut areas lying beneath said flanges and adjacent the junction of said flanges with the remainder of said diaphragm members.

References Cited in the file of this patent

UNITED STATES PATENTS

| | | |
|---|---|---|
| 1,613,292 | Raleigh | Jan. 4, 1927 |
| 2,556,596 | Perkins | June 12, 1951 |
| 2,603,973 | Wallace | July 22, 1952 |
| 2,645,248 | Baker | July 14, 1953 |
| 2,761,471 | Cook | Sept. 4, 1956 |

FOREIGN PATENTS

| | | |
|---|---|---|
| 523,548 | Great Britain | July 17, 1940 |